Jan. 1, 1952
E. A. ODIN
2,580,585
ADJUSTABLE BLOCK
Filed Sept. 9, 1948
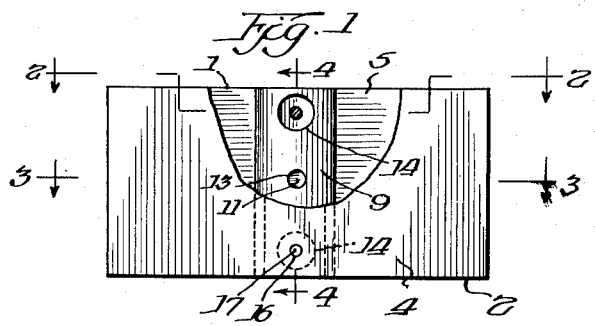
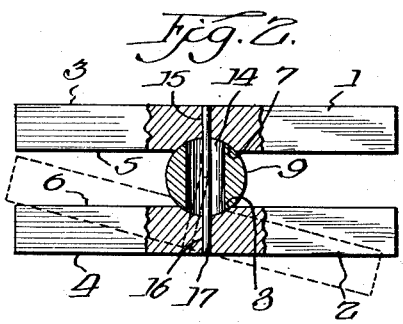
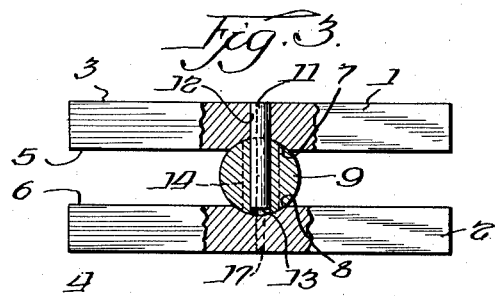
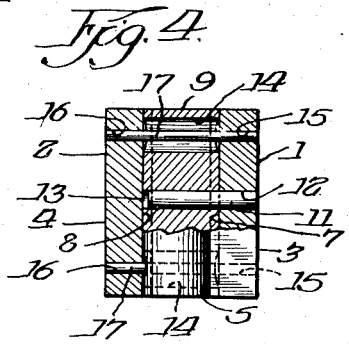
Inventor:
Eugene A. Odin.
By Lee & Lee
Attys Patented Jan. 1, 1952

2,580,585

UNITED STATES PATENT OFFICE 2,580,585

ADJUSTABLE BLOCK

Eugene A. Odin, Chicago, Ill.

Application September 9, 1948, Serial No. 48,342

4 Claims. (Cl. 81—40)

The invention relates generally to an adjustable structure, and more particularly to such a structure which may be adapted for use in connection with a clamping mechanism or the like.

The invention has among its objects the production of such an adjustable structure which, for example, may be utilized in connection with a vise mechanism or the like, whereby tapered and other non-rectangular objects may be readily held by such clamping mechanism, which adjustable structure is very simple in construction, durable and very efficient for the purposes intended, and which may be constructed as an integral assembly with no separate or loose parts, and which is spring biased to return the parts to a normal operating position.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts:

Fig. 1 is a front elevational view of an adjutable block embodying the present invention with portions thereof broken away to disclose the details of construction;

Fig. 2 is a sectional view taken approximately on the line 2—2 of Fig. 1;

Fig. 3 is a sectional view taken approximately on the line 3—3 of Fig. 1; and

Fig. 4 is a sectional view taken approximately on the line 4—4 of Fig. 1.

For the purposes of explanation, the present invention is illustrated in the drawings in the form of an adjustable block particularly adapted for use in vises to provide an adjustable jaw, whereby tapered and other non-rectangularly shaped objects may be readily held in such a vise.

The construction illustrated comprises a pair of rectangularly shaped members or blocks 1 and 2 arranged in spaced opposed relation with their respective outer faces 3 and 4, and their respective inner faces 5 and 6 normally being substantially parallel. In the construction illustrated, each of the members 1 and 2 is provided with an arcuate shaped groove or channel, the groove 7 in the member 1, and the groove 8 in the member 2 having the same radius of generation and aligned with each other. Positioned in both grooves is a cylindrically shaped pin 9 which has the same radius of generation as the grooves 7 and 8, so that the cooperating surfaces of the grooves and pin are complementary to one another.

As illustrated in Fig. 3, the pin 9 is secured to the member 1 by a cylindrical pin or key 11 inserted in an aperture 12 in the member 1, and an aperture 13 in the pin 9, the diameters of the apertures 12 and 13 and key 11 being such to provide a press fit when the key 11 is inserted in the respective apertures, thus securely fastening the pin 9 to the member 1. The pin 9 is also provided, in the construction illustrated, with a pair of transversely extending holes 14 communicating at their respective ends with the grooves 7 and 8. Extending through each of the holes 14 and having their ends extending through holes 15 and 16 in the members 1 and 2 respectively, is an elongated substantially straight spring element 17. The size of the ends of the elements 17 and the size of the holes 15 and 16, in the respective members, are such that the spring elements, when inserted into the respective members, will be securely held in place by a press fit, thereby maintaining the blocks in assembled relation on the pin 9. It will be noted that the diameter of the spring elements 17 is considerably less than that of the holes 14, so that the member 2 may be rotated about the axis of the pin, the spring elements 17 having sufficient space to flex, as indicated in dotted lines in Fig. 2, the elements having sufficient inherent resiliency to return the block 2 to its normal position, illustrated in the drawings, when pressure is released from the blocks.

The device illustrated may be utilized as an adjustable jaw in connection with a vise structure, in which case, the device is positioned between the open vise jaws, one of the faces 3 or 4 being engaged with one of the jaws of the vise. When an article is placed in the vise between the free or exposed face of the device and the other jaw of the vise, and the vise jaws moved towards one another, the members 1 and 2 are free to move about the axis of the pin 9 and adjust themselves to the surface of the article to be held, pressure being transmitted from one member to the other through the pin 9, such stresses being distributed over the arcuate surfaces of the grooves 7 and 8 and cooperating outer surface of the pin 9.

It will be apparent that the amount of adjustability desired may be varied to meet individual requirements by varying the size of the members 1 and 2, the distance between the members and the size of the pin employed. Likewise, the members 1 and 2 may be of any suitable shape to meet particular applications of the invention, and if desired, the pin 9 or its equivalent may be integrally formed with the member 2, in which case, the key 11 could be omitted.

It will be noted from the above description that I have provided a novel construction for achieving adjustability between two members, which construction is very simple and has a minimum of parts, thus rendering it inexpensive to manufacture, and which may be constructed as a single assembly without separate parts capable of being lost.

Having thus described my invention, it is obvious that various immaterial modifications may be made in the same without departing from the scope of my invention; hence, I do not wish to be understood as limiting myself to the exact form, construction, arrangement and combination of parts herein shown and described, or uses mentioned.

What I claim as new and desire to secure by Letters Patent is:

1. In a device of the kind described, the combination of a pair of opposed spaced-apart members, one of said members having an arcuate concave longitudinally extending groove formed in one of the faces thereof, and the remaining one of said members having an arcuate convex longitudinally extending ridge formed in the opposing face thereof, said concave groove and said convex ridge being complementally formed and providing bearing surfaces for transmitting compression stresses from one member to the other as well as serving to space the said members apart, the convex arcuate ridge portion having at least one transverse hole therein, and a resilient spring element extending through said hole with each of the ends thereof secured to a respective one of said members, said element serving to maintain said members in assembled relation but having sufficient transverse flexibility to permit relative movement of said members about the axis of said convex ridge portion.

2. In a device of the kind described, the combination of a pair of spaced opposed members, each having an arcuate shaped depression of like radii in their opposed faces, an intermediate member having the same radius of generation as said depressions, said intermediate member being seated in both of said depressions and operative to transmit compression stresses from one member to the other, said intermediate member having a hole therein, and a resilient spring element positioned in said hole with its ends rigidly secured to the respective opposed members for operatively maintaining said members in assembled relation but permitting relative movement of said opposed members about the axis of said intermediate member.

3. In an adjustable block, the combination of a pair of spaced blocks of rectangular shape, each having an arcuate shaped groove of like radii in their opposed faces, a cylindrical pin having the same radius of generation as said grooves, said pin being seated in both of said grooves and operative to transmit compression stresses from one block to the other, means for rigidly securing said pin to one of said blocks, said pin having a hole therein extending transversely to the axis thereof and communicating with the respective grooves in said blocks, and an elongated straight spring element extending through said hole with the ends of said element secured to respective blocks, said element being substantially non-extensible longitudinally to maintain said blocks in assembled relation but having sufficient transverse flexibility to permit relative movement thereof about the axis of said pin.

4. In a device of the kind described, the combination of a pair of spaced members, each having an arcuate shaped depression of like radii in their opposed faces, an intermediate member having the same radius of generation as said depressions, said intermediate member being seated in both of said depressions and operative to transmit compression stresses from one member to the other, means for rigidly securing said intermediate member to one of said spaced members, said intermediate member having a hole therein communicating with the respective depressions in said spaced members, and an elongated straight spring element extending through said hole with the ends of said element secured to the respective spaced members, said element being substantially non-extensible longitudinally to maintain said spaced members in assembled relation but having sufficient transverse flexibility to permit relative movement thereof about the axis of said intermediate member.

EUGENE A. ODIN.

REFERENCES CITED

The following references are of record in the file of this patent:

UNITED STATES PATENTS

| Number | Name | Date |
|---|---|---|
| 292,874 | Thompson | Feb. 5, 1884 |
| 629,783 | Fanning | Aug. 1, 1899 |
| 1,006,509 | Starrett | Oct. 24, 1911 |

FOREIGN PATENTS

| Number | Country | Date |
|---|---|---|
| 40,350 | Switzerland | July 1, 1907 |
| 229,083 | Great Britain | Feb. 19, 1925 |

OTHER REFERENCES

Publication, Popular Science, November 1944, reverse side of page 194.